United States Patent [19]

Tsuchiya

[11] Patent Number: 5,184,339
[45] Date of Patent: Feb. 2, 1993

[54] INFORMATION RECORDING-REPRODUCING HEAD DRIVING CIRCUIT

[75] Inventor: Keiji Tsuchiya, Yokohama, Japan
[73] Assignee: Canon Kabushiki Kaisha, Tokyo, Japan
[21] Appl. No.: 707,781
[22] Filed: May 30, 1991

[30] Foreign Application Priority Data

May 31, 1990 [JP] Japan .................................. 2-143725

[51] Int. Cl.$^5$ .............................................. G11B 7/085
[52] U.S. Cl. ................................. 369/44.280; 369/32; 360/78.07; 235/476
[58] Field of Search ................... 369/32, 44.28, 47, 50, 369/54; 360/78.04–78.07; 235/454, 476, 477; 377/3, 110

[56] References Cited

U.S. PATENT DOCUMENTS

| | | | |
|---|---|---|---|
| 4,355,273 | 10/1982 | Du Vall | 360/78.07 X |
| 5,018,125 | 5/1991 | Uchikoshi et al. | 369/44.25 |
| 5,020,044 | 5/1991 | Shimonou | 369/44.25 X |
| 5,083,301 | 1/1992 | Matoba et al. | 369/32 |
| 5,130,964 | 7/1992 | Ito | 369/32 X |

*Primary Examiner*—Wayne R. Young
*Attorney, Agent, or Firm*—Fitzpatrick, Cella, Harper & Scinto

[57] ABSTRACT

An information recording-reproducing head driving circuit for moving an information recording-reproducing head from the current position on a recording medium to a desired position while velocity-controlling the head includes a pulse motor for moving the information recording-reproducing head relative to the recording medium, a timer for counting down a count value set to take the driving timing of the pulse motor, and controller for calculating the count value on the basis of a predetermined time table and setting the count value in the timer, and generating a driving pulse to the pulse motor when the timer has counted down the count value. The controller substracts a desired value extracted from the time table from the count value set in the timer the last time to thereby accomplish the calculation of a new count value.

3 Claims, 9 Drawing Sheets

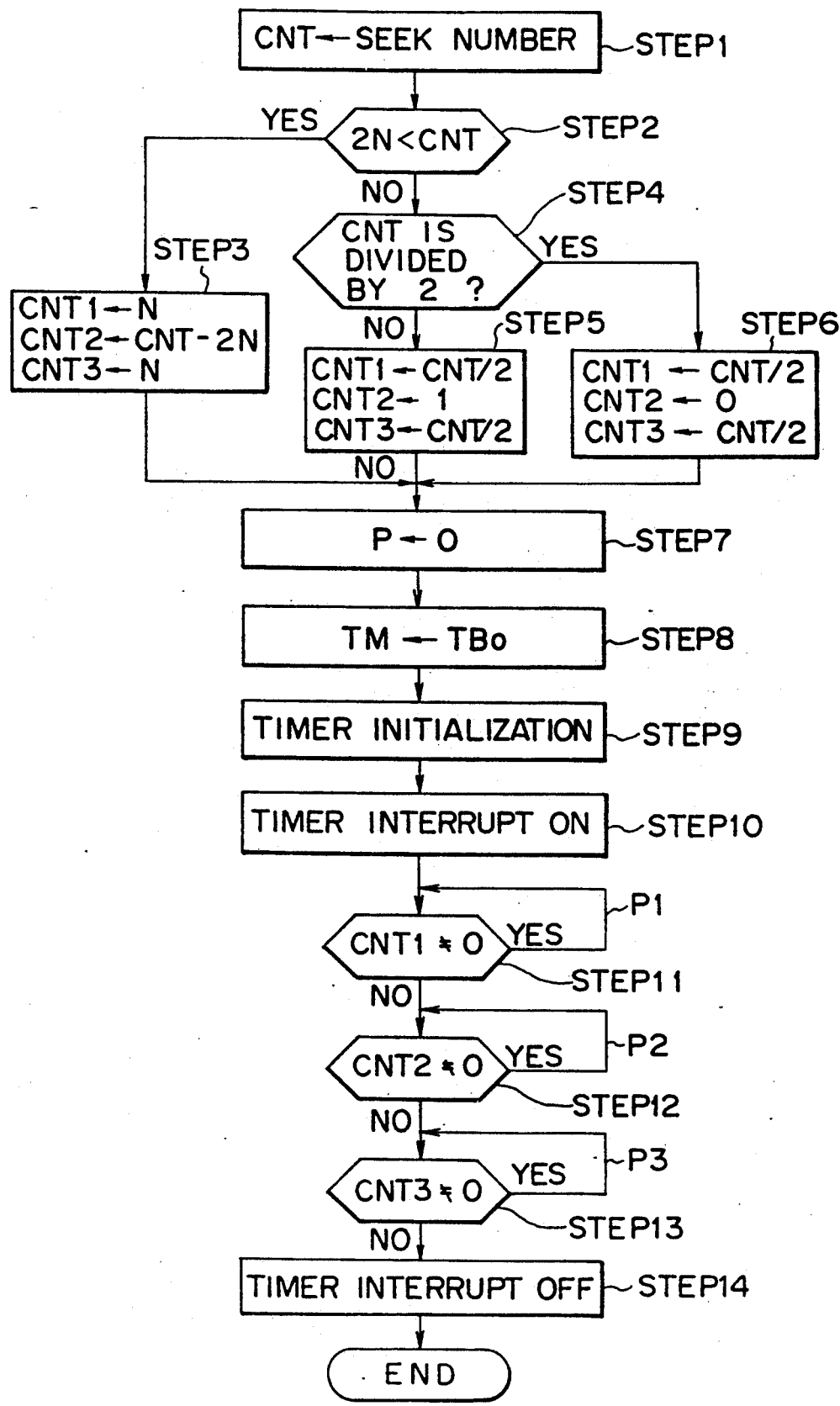

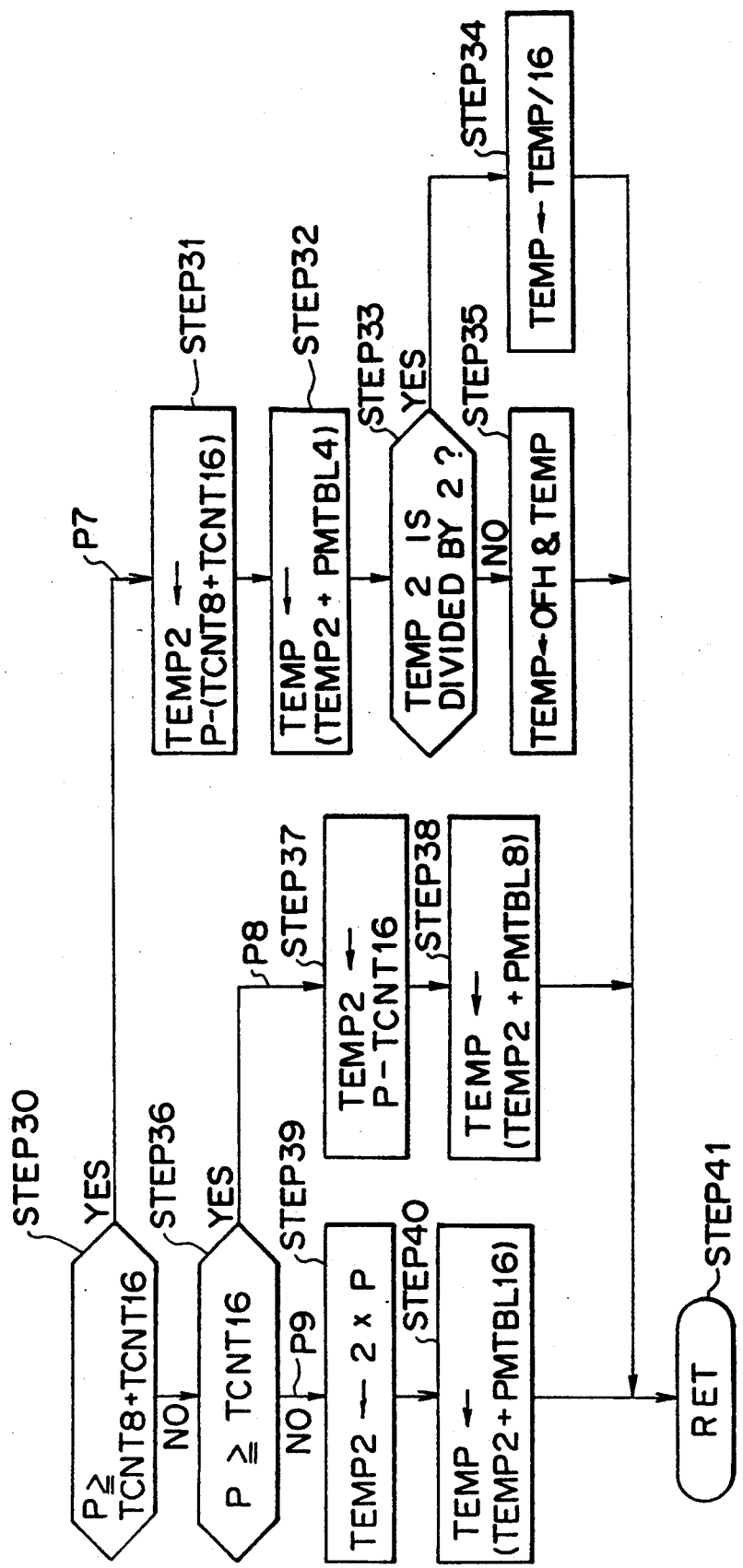

INFORMATION RECORDING-REPRODUCING HEAD DRIVING CIRCUIT

BACKGROUND OF THE INVENTION

This invention relates to an information recording-reproducing apparatus for recording and/or reproducing information, and particularly to an information recording-reproducing head driving circuit for driving a recording and/or reproducing head in such an apparatus.

Various forms such as a disk-like form, a card-like form and a tape-like form are known as the forms of recording media for recording information thereon by the use of a semiconductor laser and reading out the recorded information therefrom. Among these optical information recording media, the card-like optical information recording medium (hereinafter referred to as the optical card) is expected to have great demand as an information recording medium of relatively great capacity which is compact and light in weight and readily portable.

FIG. 1 of the accompanying drawings is a block diagram of an optical card information recording-reproducing apparatus for recording information on an optical card and reproducing the information recorded on the optical card.

In FIG. 1, the reference numeral 50 designates a host computer which is a host controller, the reference numeral 51 denotes an optical card information recording-reproducing apparatus, and the reference numeral 57 designates an optical card.

The apparatus 51 includes an apparatus controlling MPU 52 containing therein a CPU, a timer and a memory, a signal modulation-demodulation circuit 53, a semiconductor laser driving circuit 54, an auto-focus (AF) and auto-tracking (AT) control circuit 55, an optical head 56, a pulse motor 58 which is a head feeding mechanism for moving the optical head across tracks and causing a light beam spot to access to a desired track on the optical card, a DC motor 59 for feeding the optical card, a rotary encoder 60 mounted on the DC motor to detect the amount of feeding of the optical card, PLL 61 for rotating the DC motor at a constant speed, an optical card insertion sensor 62 and an optical card erroneous insertion discrimination sensor 63.

FIG. 2 of the accompanying drawings is a block diagram of a driving circuit for the pulse motor 58 shown in FIG. 1. A motor driver 1 amplifies a pulse output by the MPU 52 and applies it to the pulse motor 58 thereby driving the pulse motor 58.

FIG. 3 of the accompanying drawings schematically shows the head feeding mechanism and the optical card. An information recording area 4 exists on the optical card 57, and tracking tracks 2 and information tracks 3 are included in the area 4. As the pulse motor 58 rotates, a lead screw 5 is rotated, and power is transmitted to the optical head 56 through a needle 6, whereby the optical head 56 is moved along guide rods 7 in a direction transverse to the information tracks 3.

FIG. 4 of the accompanying drawings is a schematic view of the optical head 56. The reference numeral 64 designates a semiconductor laser, the reference numeral 65 denotes a collimator lens, the reference numeral 66 designates a beam splitter, the reference numeral 67 denotes an objective lens, the reference numeral 57 designates an optical card, the reference numeral 72 denotes a transparent substrate, the reference numeral 70 designates a recording layer, the reference numeral 71 denotes a back-up substrate, the reference numeral 68 designates a condensing lens, and the reference numeral 69 denotes a photo-detector. A light beam emitted from the semiconductor laser 64 is made into a parallel light beam by the collimator lens 65, is transmitted through the beam splitter 66, is stopped down by the objective lens 67 and forms a minute spot on the information recording layer 70 of the optical card 57. The reflected light from the information recording layer 70 of the optical card 57 is again made into a parallel light beam by the objective lens 67, and is reflected by the beam splitter 66 and passes through the condensing lens 68 to the photodetector 69. The output of the photodetector 69 is input to the AT/AF control circuit, and AF control and AT control are effected by the use of a conventional method.

A description will now be provided of the operation of effecting recording or reproduction on the basis of the above-described construction after the optical card is inserted into the apparatus 51.

When the optical card is inserted into the apparatus 51, the insertion sensor 62 detects the insertion of the optical card, and the MPU 52 drives the DC motor. When the optical card is directed into the apparatus 51 by a conveying mechanism, not shown, whether the optical card has been inserted in a regular state is determined by the discrimination sensor 63, and if it is determined that the optical card has been inserted in a regular state, the optical card is fed to a predetermined position. Thereafter, the semiconductor laser driving circuit is driven to turn on the semiconductor laser. Subsequently, the MPU 52 drives the pulse motor 58 to draw in AT and AF by a desired track on the optical card. When the optical head arrives at the desired track, AT and AF are drawn in. When information is to be recorded on the optical card, the DC motor is driven to thereby reciprocally move the optical card and recording information is transferred from the host computer 50 to the modulation-demodulation circuit 53 of the apparatus 51, and the semiconductor laser driving circuit 55 is driven in accordance with a modulation signal, whereby the recording of the information is effected. During reproduction, the optical card is likewise reciprocally moved, whereby the light beam spot scans a recording pit. Accordingly, a reproduction signal is obtained in the photodetector 69 and this is transferred to the host computer 50 through the modulation-demodulation circuit 53, whereby there is obtained reproduced information.

Now, to effect the recording and reproduction of the information, it is necessary to cause the light beam spot to access a desired track on the optical card as previously described. The time required for such access of the optical head greatly affects the throughput of the apparatus and therefore, in recent years, it has been desired to shorten the access time.

To shorten the access time, it is necessary to shorten the seek time during with the head is moved. As a technique therefor, there is a method of velocity-controlling the head by a trapezoidal locus.

FIG. 5 of the accompanying drawings shows the relation between the seek time during which the head was sought by a trapezoidal locus and the movement velocity of the head.

The method of velocity-controlling the head by a trapezoidal locus will now be described with reference to Table 1 and FIGS. 6A and 6B of the accompanying drawings. Table 1 is an example of data table for driving the pulse motor, and this table will hereinafter be called the acceleration table. The data in such an acceleration table are usually written with data used during acceleration as a standard. (During deceleration, data is read in reverse. Also, this acceleration table is usually stored in the memory of the MPU in the apparatus. PMTBL means the top address of the table, PMEND means the end address of the table, and DW means that the data succeeding thereto is data of two bytes. TB$_p$ case of Table 1, the pointer number becomes greater in the rightward direction and downward direction of the data row with a value 5715 as pointer 0). Flow charts for velocity-controlling the head by a trapezoidal locus are shown in FIGS. 6A and 6B. However, the range of the table pointer p is greater than 0 and less than N. FIG. 6A is a background routine, and FIG. 6B is a timer interrupt routine.

The background routine of FIG. 6A will first be described. When an access command comes in from an outside host computer, the MPU 52 calculates the seek track number (hereinafter referred to as CNT) from the current track to a desired track. When CNT is greater than two times, i.e., N (the total number of the data of the acceleration table), if the seek track number during the acceleration period is CNT1, CNT1 is N, and if the seek track number corresponding to a predetermined velocity period is CNT2, CNT2 is (CNT-2N). Also, if the seek track number corresponding to the deceleration period is CNT3, CNT3 is N. When CNT is 2N or less, whether CNT can be divided by 2 is examined, and when it cannot be divided, the seek track number CNT1 corresponding to the acceleration period is made into the same value as the quotient obtained by dividing CNT by 2, and the seek track number CNT2 corresponding to the predetermined velocity period is made into 1, and the seek track number CNT3 corresponding to the deceleration period is made into the same value as CNT1. Also, when CNT can be divided by 2, the seek track number CNT1 corresponding to the acceleration period is made into the same value as the quotient obtained by dividing number CNT2 corresponding to the predetermined velocity period is made into 0, and the seek track number CNT3 during the deceleration period is made into the same value as CNT1. The seek track numbers corresponding to the acceleration period, the predetermined velocity period and the deceleration period, respectively, are determined in this manner and the values thereof are stored in a memory (steps 72-76). Thereafter, the table pointer p is set to 0 (step 77), and then the timer in the MPU 52 is initialized (step 78), and timer interruption is permitted (step 79). Subsequently, if CNT≠0 (or CNT2≠0 or CNT3≠0) (steps 710, 711 and 712), the program skips to the timer interrupt routine.

Here, a description will be provided of the timer interrupt routine of FIG. 6B. Since processing differs when the movement velocity of the head is acceleration, a predetermined velocity or deceleration, the program branches off to respective processes depending on the values of CNT1, CNT2 and CNT3.

If CNT1≠0 (CNT2≠0, CNT3≠0) (steps 714 and 718), the program branches off to p13, and 1 is subtracted from CNT1 previously stored in the memory (step 715). Thereafter, data (count value) indicated by the table pointer p is set in the timer (step 716), and the table pointer is increased by 1 (step 717).

If the head is rotating at a predetermined velocity, the program branches off to p14, and 1 is subtracted from CNT2 (step 719). Thereafter, the data indicated by the table pointer p is set in the timer (step 720).

If the pulse motor is decelerating, the program branches off to p15, and 1 is subtracted from CNT2 (step 721). Thereafter, 1 is subtracted from the table pointer p (step 722), and the data indicated by the table pointer is set in the timer (step 723).

At p13, p14 and p15, the data set in the timer is counted down by the timer and when the count value becomes 0, the MPU 52 outputs a pulse for driving the pulse motor (step 729), thus terminating the interrupt routine. The process is then returned to the background routine. If CNT1≠0 (or CNT2≠0 or CNT3≠0), a similar operation is repeated again (steps 710, 711 and 712). That is, during the acceleration, the table data is read in by the number of times indicated by CNT1, and during the predetermined velocity, the pulse motor is rotated by the use of the same table data by the number of times indicated by CNT2, and during the deceleration, the table data is read in reverse by the number of times indicated by CNT3. When finally, CNT3 becomes 0, the timer interrupt is inhibited (step 713) and the seek operation is terminated.

In the prior-art apparatus, however, when an attempt is made to effect highly accurate head feeding at a high speed, the amount of data in the data table for driving the pulse motor becomes great, and as a result, the data occupy much of the memory in the MPU. This has been a serious problem for the MPU which originally has a small memory capacity.

SUMMARY OF THE INVENTION

The present invention has been made in view of such a problem and the object thereof is to provide an information recording-reproducing head driving circuit in which head feeding by a pulse motor of high speed and high accuracy is made possible without much of a memory in an MPU being occupied The above object is achieved by an information recording-reproducing head driving circuit in which an information recording-reproducing head is moved from the current position on a recording medium to a desired position while being velocity-controlled, and which is provided with a pulse motor for moving the information recording-reproducing head relative to the recording medium, a timer for counting down a count value set to take the driving timing of the pulse motor, and control means for calculating the count value on the basis of a predetermined time table and setting the count value in the timer, and producing a driving pulse to the pulse motor when the timer has counted down said count value, the control means subtracting a desired value extracted from the time table from the count value set in the timer the last time, thereby calculating a new count value.

BRIEF DESCRIPTION OF THE DRAWINGS

FIGS. 7A, 7B and 7C are flow charts for illustrating a head feeding method according to the present invention.

DETAILED DESCRIPTION OF THE PREFERRED EMBODIMENTS

A specific embodiment of the present invention will hereinafter be described with reference to the drawings.

In the present invention, the construction of the apparatus is the same as the construction of the prior-art apparatus and therefore, in the following, a description will be provided by the use of the prior-art apparatus construction.

A method of making the acceleration table of the pulse motor stored in the memory in the MPU 52 which is used when the head is sought by trapezoidal locus velocity control will first be described by the use of Table 1.

In Table 1, the difference between adjacent data is calculated in accordance with the following equations:

$$STB_p = 0 \quad (p=0)$$

$$STB_p = TB_{p-1} - TB_p \quad (1 \leq p \leq N-1)$$

where $TB_p$ is the pth table data, p is the table pointer, and N is the total number of data of the table.

The calculated $STB_p$ is tabulated in Table 2. In Table 2, PMTBL means the top address of the table. PMEND means the end address of the table, and DW means that the data succeeding thereto is data of 2 bytes Paying attention to Table 2, $STB_p$ becomes smaller as the table pointer p becomes greater. So, the case is classified for each magnitude of $STB_p$ as follows.

(1) In the case of $STB_p \geq 256$, 2 bytes (16 bits) are necessary to express (binary notation) that value in the memory and therefore, a 2-byte table is used and $STB_p$ is defined as 2-byte table data.

(2) In the case of $256 > STB_p \geq 16$, 1 byte (8 bits) is necessary to express that value in the memory and therefore, a 1-byte table is used and $STB_p$ is defined as 1-byte table data.

Figure 1:
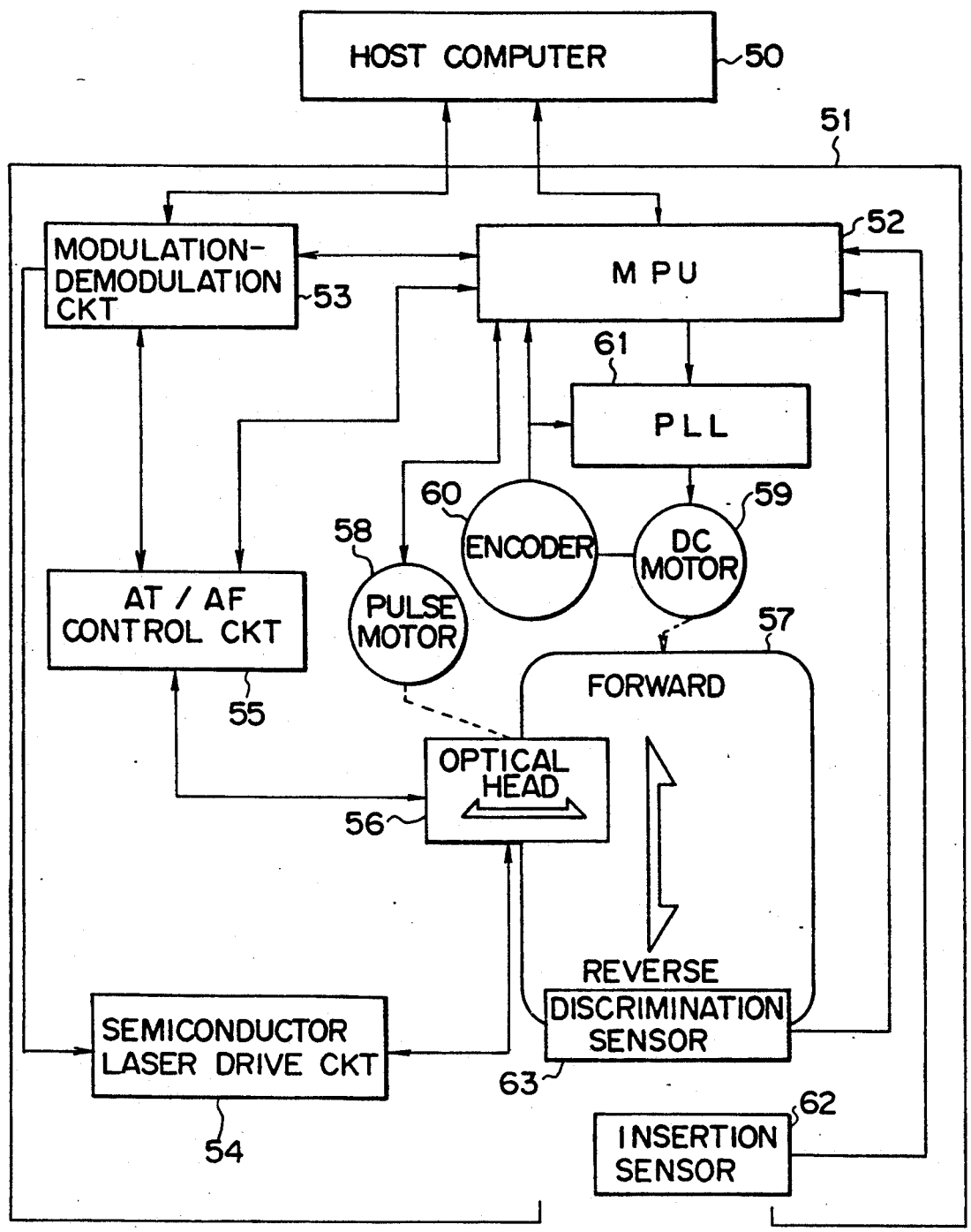
FIG. 1 is a block diagram showing an optical card information recording-reproducing apparatus.
Figure 2:
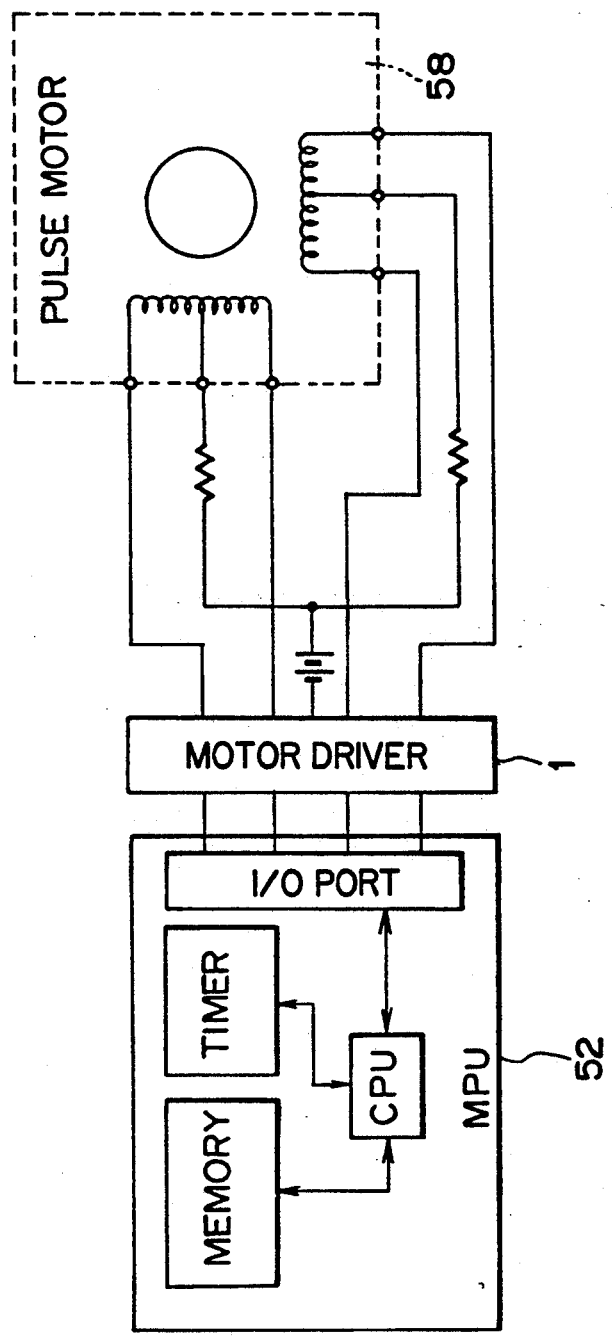
FIG. 2 is a block diagram of a pulse motor driving circuit.
Figure 3:
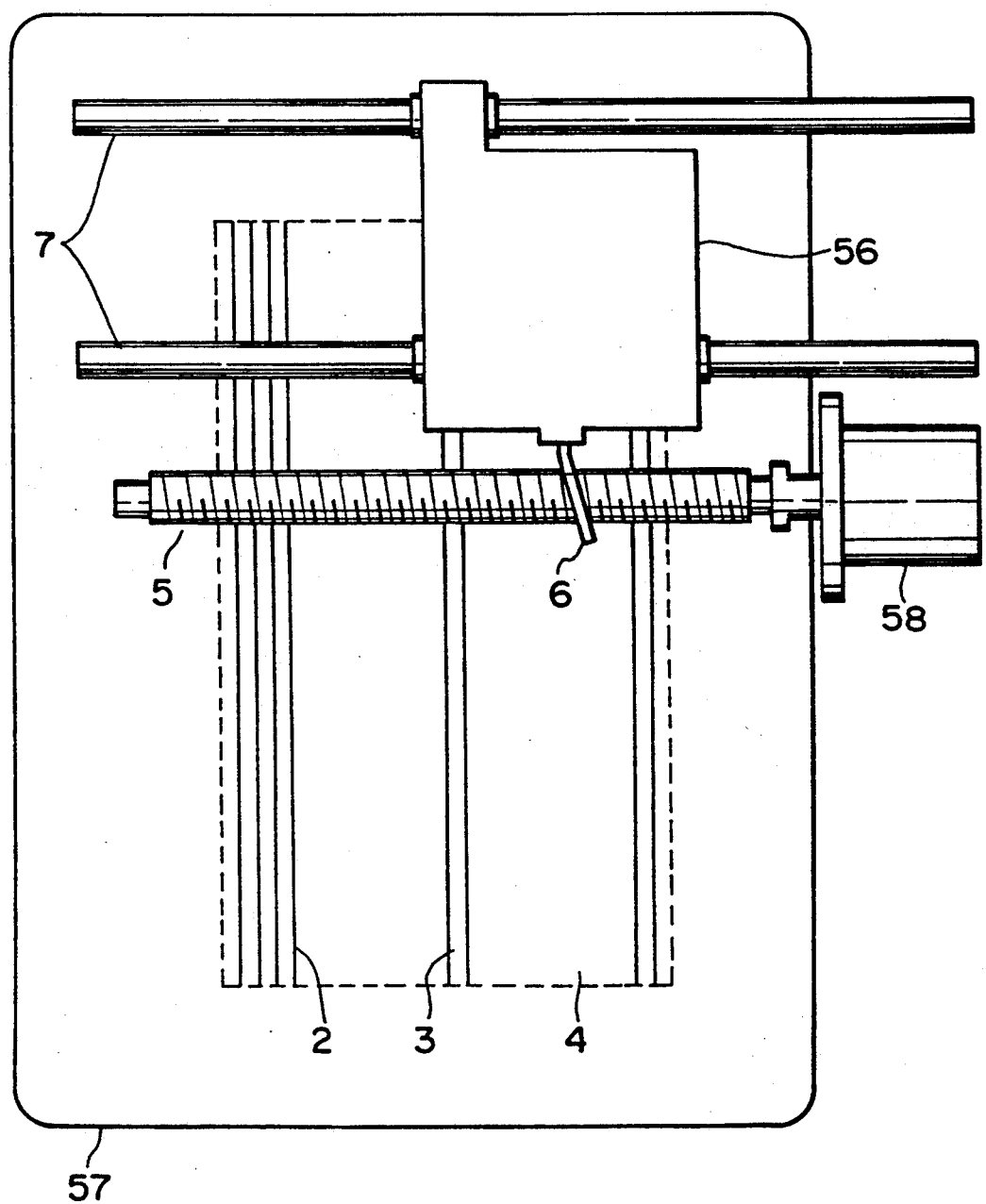
FIG. 3 is a view for illustrating the relative movement of a head feeding mechanism and an optical card.
Figure 4:
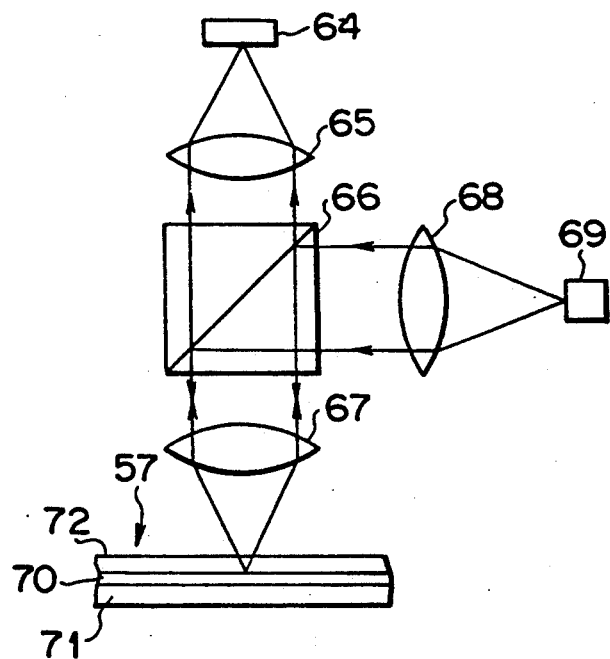
FIG. 4 is a schematic view of an optical head.
Figure 5:
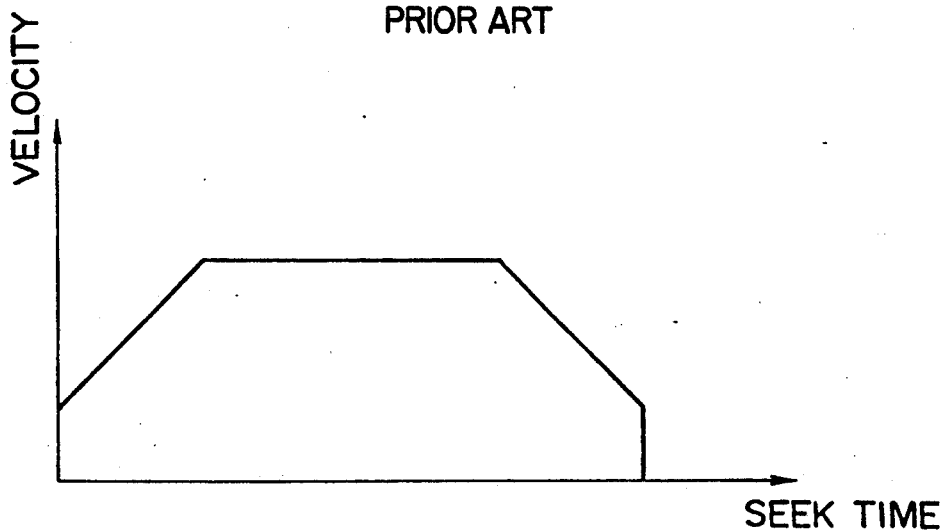
FIG. 5 is a graph showing the relation between the seek time when the head has been sought by a trapezoidal locus mode and the movement velocity of the head.
Figure 6A:
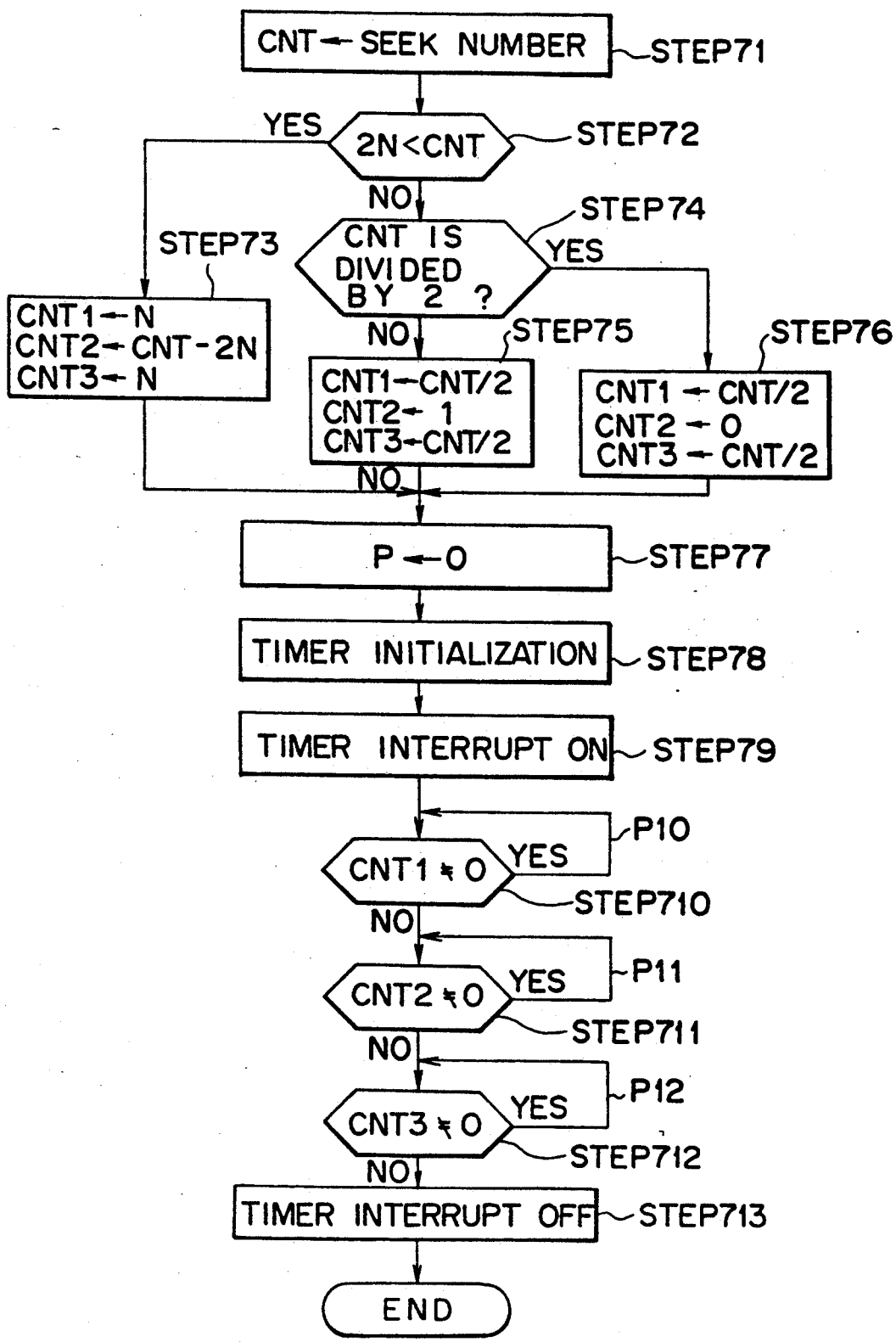
FIGS. 6A and 6B are flow charts for illustrating a head feeding method according to the prior art.
Figure 6B:
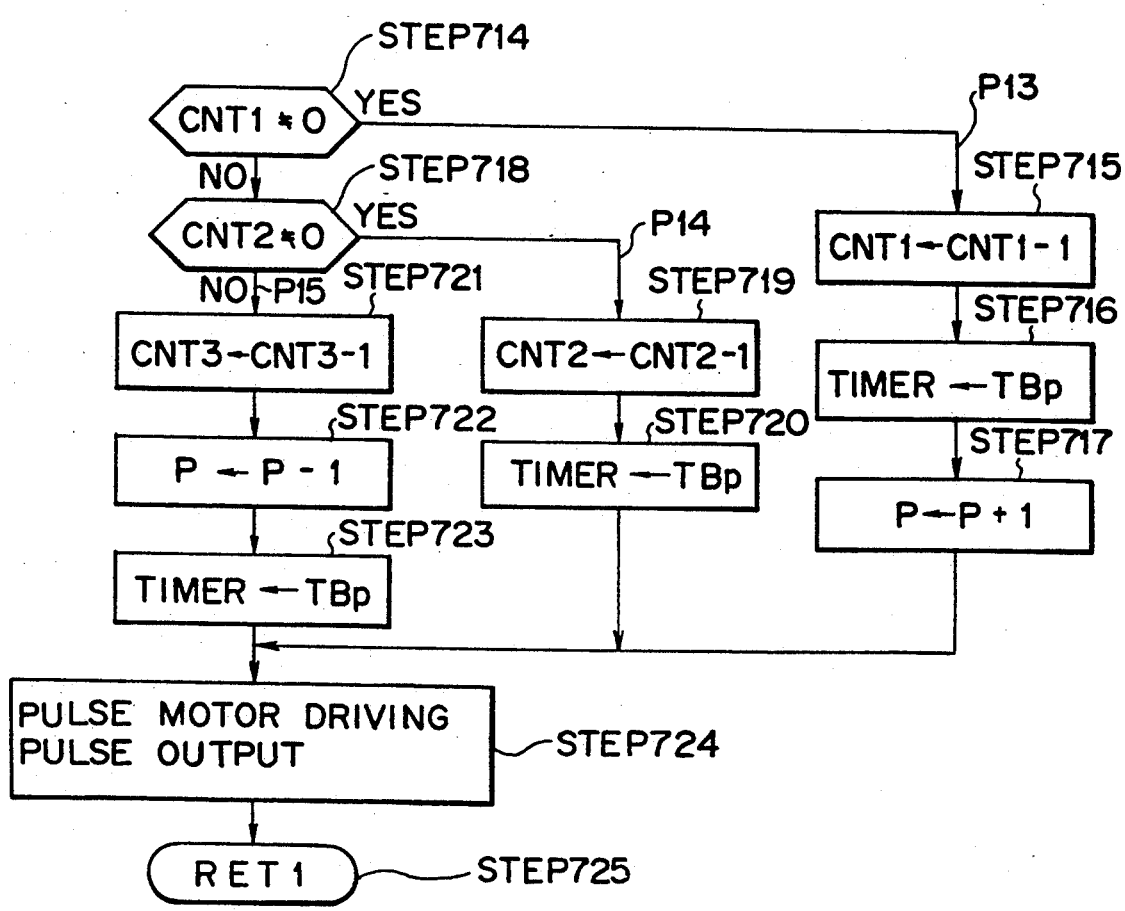
Figure 7B:
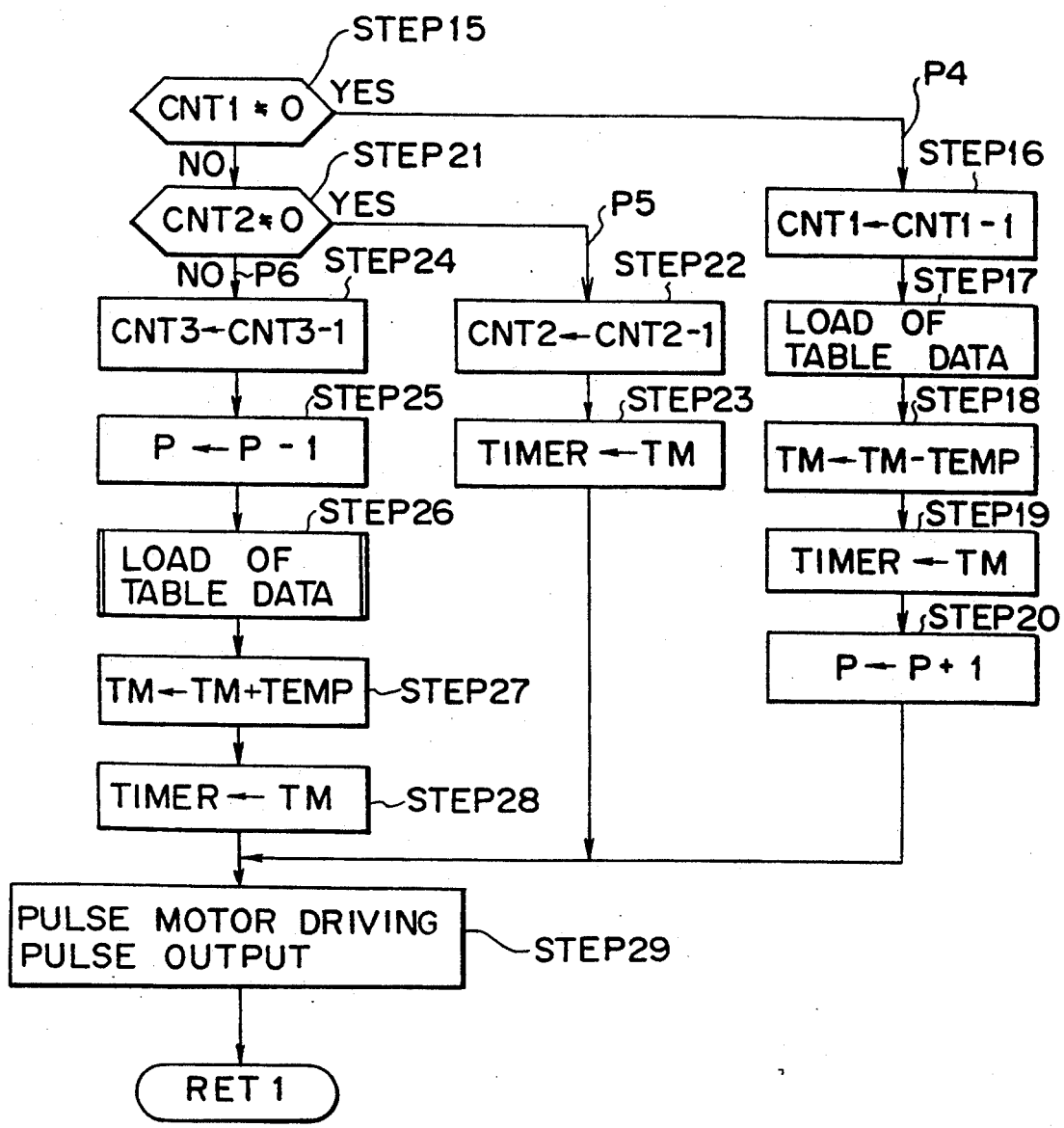

(3) In the case of $16 > STB_p$, 4 bits are necessary to express that value in the memory. Accordingly, a 4-bit table is used and $F4(p) = STB_p * 16 + STB_{p+1}$ is defined as table data. That is, the table is divided for each magnitude of data, and 2-byte data can be put into a 2-byte table, 1-byte data can be put into a 1-byte table, and as regards 4-bit data, two data can be put into 1 byte and therefore, different data are put into the most significant 4 bits and the least significant 4 bits in 1 byte, and are used as data. The thus classified table data are shown in Table 3. $TB_0$ shows the initial value, which, in Table 1, is the first value (5715). PMTBL16, PMTBL8 and PMTBL4 represent the top addresses of 16-bit, 8-bit and 4-bit tables, respectively, PMEND16, PMEND8 and PMEND4 represent the end addresses of the respective tables, and TCNT16, TCNT8 and TCNT4 represent the numbers of the respective table data. DW represents that the data succeeding thereto is 2-byte table data, and DB represents that the data succeeding thereto is a 1-byte table data. These table data are stored in the memory in the MPU 52. The flow charts when the pulse motor is driven on the basis of the aforedescribed table data by the use of Table 3 are shown in FIGS, 7A and 7B. FIG. 7A shows the background routine, FIG. 7B shows the timer interrupt routine, and FIG. 7C shows the subroutine for loading the table data.

The background routine of FIG. 7A will first be described. When an access command comes from the outside host computer into the MPU 52, the MPU 52 calculates the seek track number (CNT) from the current track to a desired track (step 1). If CNT is greater than two times, i.e., N, when the seek track number during the acceleration period is CNT1, CNT1 is set up as N (step 3), and when the seek track number during the predetermined velocity period is CNT2, CNT2 is set up as {CNT-2N}, and when the seek track number during the deceleration period is CNT3, CNT3 is set up as N. When CNT is 2N or less, whether CNT can be divided by 2 is examined (step 4), and if CNT cannot be divided by 2, the seek track number CNT1 during the acceleration period is made into a value equal to the quotient obtained by dividing CNT by 2, and the seek track number CNT2 during the predetermined velocity period is made into 1, and the seek track number CNT3 during the deceleration period is made into the same value as CNT1 (step 5). If CNT can be divided by 2, the seek track number CNT1 during the acceleration period is made into the same value as the quotient obtained by dividing CNT by 2, and the seek track number CNT2 during the predetermined velocity period is made into 0 and the seek track number CNT3 during the deceleration period is made into the same value as CNT1 (step 6).

After the seek track numbers during the acceleration period, the predetermined velocity period and the deceleration period, respectively, have been determined in this manner, those determined values are stored in the memory in the MPU 52.

Subsequently, the table pointer p is rendered to, 0 (step 7), and further, TM (a value set in the timer) is rendered to TB0 (step 8). Thereafter, the timer is initialized (step 9) to thereby permit the timer interruption (step 10). If CNT≠0 (or CNT2≠0 or CNT3≠0) (steps 11, 12 and 13), the program skips to the timer interrupt routine. The timer interrupt routine will now be described here. The processing in the timer interrupt routine differs depending on the acceleration, the predetermined velocity or the deceleration and therefore, branches off to respective process depending on the values of CNT1, CNT2 and CNT3. If CNT1≠0 (step 15), the program branches off to p4, and CNT1 stored earlier is decreased by 1, and that value is stored in the memory instead of CNT1 stored earlier (step 16). Subsequently, the data indicated by the table pointer is called out from the acceleration table in the memory in the MPU 52 (step 17). This called-out data will hereinafter be referred to as Temp. Temp called out from TM is then subtracted (step 18), and the result is stored as new TM. Thereafter, the value of this TM is set in the timer (step 19), and the table pointer is increased by 1 (step 20). The timer then counts down the set value, and when the count value becomes 0, the MPU 52 outputs a pulse motor driving pulse (step 29). Then, the program returns to the background routine, and if CNT1≠0, a similar operation is repeated (step 11). If it is the predetermined velocity period, that is, CNT2≠0 (step 21), the program branches off to p5, and CNT2 stored earlier is decreased by 1 (step 22). Since the table pointer during the predetermined velocity period is not varied, TM set in the timer the last time is again set in the timer (step 23). The timer then counts down the set value, and when the count value becomes 0, the MPU 52 outputs a pulse motor driving pulse. Then, the program returns to the background routine again and if CNT2≠0, a similar operation is repeated (step 12).

If it is the deceleration period, that is, CNT3≠0, the program branches off to p6, and CNT3 and the currently stored table pointer are decreased by 1 (steps 24 and 25). Thereafter, the data indicated by the current table pointer is called out from the acceleration table in the memory in the MPU 52 (step 26). Then, Temp is added to TM set in the timer the last time (step 27), and the result is stored as TM (step 28). The value of this TM is then set in the timer. The timer counts down the set value, and when the count value becomes 0, the MPU 52 outputs a pulse motor driving pulse (step 29). Then, the program returns to the background routine again, and if CNT3≠0, a similar operation is repeated (step 13). Finally, when CNT3 becomes 0, the timer interruption is inhibited (step 14) and the seek is terminated.

The routine for calling out the data indicated by the table pointer from the acceleration table in the memory in the MPU 52 will now be described in greater detail.

FIG. 7C is the flow chart of a subroutine for calling out and storing the table data indicated by the table pointer p.

The table data is divided into 16-bit data, 8-bit data and 4-bit data and therefore, it is necessary to determine which bit data the current table pointer p is. For this purpose, the table pointer p is compared with a value resulting from the addition of TCNT16 indicative of the number of 16-bit data to TCNT8 indicative of the number of 8-bit data (step 30). If the, table pointer p is smaller than (TCNT8+TCNT16), the process is abandoned to a step 36. If the table to a step 31. At the step 36, the table pointer p is further compared with TCNT16, and if the table pointer p is smaller than TCNT16, the process is advance to a step 39. If the table pointer p is greater than TCNT16, the process is abandoned to a step 37.

In this way the present invention determines which bit data the data indicated by current table pointer p is determined.

If the table pointer p is less than TCNT16, it is determined to be 1-bit data and the program branches off to p9. Then, the address in the data table is calculated to call out on the basis of the table pointer p (step 39), whereafter the table data is loaded by 2 bytes from that address. That value is then stored in Temp (step 40), thus terminating the subroutine (step 41). Thereafter, a return is made to the background routine. If the table pointer p is greater than TCNT16 and smaller than the value of TCNT8 plus TCNT16, it is determined to be 8-bit data, and the program branches off to p8. Subsequently, the address in the data table is calculated to call out on the basis of the table pointer p (step 37), whereafter the table data is loaded by 1 byte from that address. That value is then stored in Temp (step 38), thus terminating the subroutine. Thereafter, a return is made to the background routine, (step 41). If the table pointer p is greater than the value of TCNT8 plus TCNT16, it is determined to be 4-bit data, and the program branches off to p7. Then, the address in the data table is calculated to call out on the basis of the table pointer p (step 31), whereafter the table data is loaded by 1 byte from that address (step 32). In the case of 4-bit data, different table data are contained in the most significant 4 bits and the least significant 4 bits in 1 byte and therefore, it is necessary to convert the 1-byte data loaded to call out and take out the data into the original data. Therefore, when the data to call out is determined to be the most significant 4 bits in the 1-byte data (step 33), the quotient obtained by dividing the called-out 1-byte data by 16 is stored in Temp (step 34), and when the data to call out is determined to be the least significant 4 bits, the most significant 4 bits are masked by 0, and then are stored in Temp (step 35), thus terminating the subroutine (step 41). Thereafter, a return is made to the background routine. As regards the determination as to whether the data indicated by the table pointer p is the most significant 4 bits or the least significant 4 bits in the 1-byte data, if the value obtained by subtracting TCNT16 and TCNT8 from the value of the table pointer p is divided by 2 and can be divided by a positive integer, the data indicated by that table pointer p is regarded as the most significant 4 bits in the 1-byte data, and if the value cannot be divided by a positive integer, the data is regarded as the least significant 4 bits in the 1-byte data.

Other Embodiments

In the aforedescribed embodiment, a description has been made of the method of taking the difference between the adjacent data of the pulse motor acceleration table, making a 16-bit table, 8-bit table an and a 4-bit table for each magnitude thereof, decreasing the memory amount indicated by the acceleration table, and accelerating the head by the use of that table. However, the size of the acceleration table and the magnitude of the difference between the adjacent data differ depending on the conditions such as the acceleration and maximum velocity of the pulse motor. Therefore, the efficient manner of dividing the table data for decreasing the memory amount can be freely determined.

A description has also been provided of the case where acceleration is linearly effected, but the present invention can also be applied to an expotential functional or other acceleration method.

As described above, in the information recording-reproducing head driving circuit of the present invention, the acceleration table for feeding the head at a high speed can be greatly compressed simply by a slight change of software, with the result that the space the acceleration table in the memory in the MPU occupies can be made small.

TABLE 1

| Pulse Motor Acceleration Table | | | | | | | | | | | | | | | | |
|---|---|---|---|---|---|---|---|---|---|---|---|---|---|---|---|---|
| PMTBL | EQU | $ | | | | | | | | | | | | | | |
| | DW | 5715, | 5192, | 4793, | 4476, | 4216, | 3997, | 3809, | 3646, | 3502, | 3375, | 3260, | 3157, | 3063, | 2976, | 3897, | 2824 |
| | DW | 2756, | 2693, | 2634, | 2579, | 2527, | 2479, | 2432, | 2389, | 2348, | 2308, | 2271, | 2235, | 2202, | 2169, | 2138, | 2108 |
| | DW | 2080, | 2053, | 2026, | 2001, | 1976, | 1953, | 1930, | 1908, | 1887, | 1867, | 1847, | 1828, | 1809, | 1791, | 1773, | 1756 |
| | DW | 1740, | 1724, | 1708, | 1693, | 1678, | 1664, | 1650, | 1636, | 1622, | 1609, | 1597, | 1584, | 1572, | 1560, | 1549, | 1537 |
| | DW | 1526, | 1515, | 1505, | 1494, | 1484, | 1474, | 1464, | 1454, | 1445, | 1436, | 1427, | 1418, | 1409, | 1401, | 1392, | 1384 |
| | DW | 1376, | 1368, | 1360, | 1352, | 1345, | 1337, | 1330, | 1323, | 1316, | 1309, | 1302, | 1295, | 1288, | 1282, | 1275, | 1269 |
| | DW | 1263, | 1256, | 1250, | 1244, | 1238, | 1233, | 1227, | 1221, | 1216, | 1210, | 1205, | 1199, | 1194, | 1189, | 1184, | 1179 |

TABLE 1-continued

Pulse Motor Acceleration Table

| | | | | | | | | | | | | | | | | |
|---|---|---|---|---|---|---|---|---|---|---|---|---|---|---|---|---|
| DW | 1174, | 1169, | 1164, | 1159, | 1154, | 1149, | 1145, | 1140, | 1136, | 1131, | 1127, | 1122, | 1118, | 1114, | 1109, | 1105 |
| DW | 1101, | 1097, | 1093, | 1089, | 1085, | 1081, | 1077, | 1074, | 1070, | 1066, | 1062, | 1058, | 1055, | 1051, | 1048, | 1044 |
| DW | 1041, | 1037, | 1034, | 1030, | 1027, | 1024, | 1020, | 1017, | 1014, | 1011, | 1007, | 1004, | 1001, | 998, | 995, | 992 |
| DW | 989, | 986, | 983, | 980, | 977, | 974, | 972, | 969, | 966, | 963, | 960, | 958, | 955, | 952, | 950, | 947 |
| DW | 944, | 942, | 939, | 937, | 934, | 932, | 929, | 927, | 924, | 922, | 919, | 917, | 915, | 912, | 910, | 908 |
| DW | 905, | 903, | 901, | 899, | 896, | 894, | 892, | 890, | 888, | 886, | 883, | 881, | 879, | 877, | 875, | 873 |
| DW | 871, | 869, | 867, | 875, | 873, | 871, | 859, | 847, | 855, | 853, | 851, | 849, | 847, | 846, | 844, | 842 |
| DW | 840, | 838, | 836, | 835, | 833, | 831, | 829, | 828, | 826, | 824, | 822, | 821, | 819, | 817, | 816, | 814 |
| DW | 812, | 811, | 809, | 807, | 806, | 804, | 803, | 801, | 799, | 798, | 796, | 795, | 793, | 792, | 790, | 789 |
| DW | 787, | 786, | 784, | 783, | 781, | 780, | 778, | 777, | 775, | 774, | 772, | 771, | 770, | 768, | 767, | 765 |
| DW | 764, | 763, | 761, | 760, | 759, | 757, | 756, | 755, | 753, | 752, | 751, | 749, | 748, | 747, | 745, | 744 |
| DW | 743, | 742, | 740, | 739, | 738, | 737, | 735, | 734, | 733, | 732, | 731, | 729, | 728, | 727, | 726, | 725 |
| DW | 724, | 722, | 721, | 720, | 719, | 718, | 717, | 715, | 714, | 713, | 712, | 711, | 710, | 709, | 708, | 707 |
| DW | 706, | 704, | 703, | 702, | 701, | 700, | 699, | 698, | 697, | 696, | 695, | 694, | 693, | 692, | 691, | 690 |
| DW | 689, | 688, | 687, | 686, | 685, | 684, | 683, | 682, | 681, | 680, | 679, | 678, | 677, | 676, | 675, | 674 |
| DW | 673, | 672, | 671, | 670, | 670, | 669, | 668, | 667, | 666, | 665, | 664, | 663, | 662, | 661, | 660, | 660 |
| DW | 659, | 658, | 657, | 656, | 655, | 654, | 653, | 653, | 652, | 651, | 650, | 649, | 648, | 648, | 647, | 646 |
| DW | 645, | 644, | 643, | 643, | 642, | 641, | 640, | 639, | 639, | 638, | 637, | 636, | 635, | 635, | 634, | 633 |
| DW | 632, | 631, | 631, | 630, | 629, | 628, | 628, | 627, | 626, | 625, | 625, | 624, | 623, | 622, | 622, | 621 |
| DW | 620, | 619, | 619, | 618, | 617, | 616, | 616, | 615, | 614, | 614, | 613, | 612, | 612, | 611, | 610, | 609 |
| DW | 609, | 608, | 607, | 607, | 606, | 605, | 605, | 604, | 603, | 603, | 602, | 601, | 601, | 600, | 599, | 599 |
| DW | 598, | 597, | 597, | 596, | 595, | 595, | 594, | 593, | 593, | 592, | 591, | 591, | 590, | 590, | 589, | 588 |
| PMEND EQU | $ | | | | | | | | | | | | | | | |

TABLE 2

Calculated Data Table

| | | | | | | | | | | | | | | | | |
|---|---|---|---|---|---|---|---|---|---|---|---|---|---|---|---|---|
| PMTBL EQU | $ | | | | | | | | | | | | | | | |
| DW | 0, | 523, | 399, | 317, | 260, | 219, | 188, | 163, | 144, | 127, | 115, | 103, | 94, | 87, | 79, | 73 |
| DW | 68, | 63, | 59, | 55, | 52, | 48, | 47, | 43, | 41, | 40, | 37, | 36, | 33, | 33, | 31, | 30 |
| DW | 28, | 27, | 27, | 25, | 25, | 23, | 23, | 22, | 21, | 20, | 20, | 19, | 19, | 18, | 18, | 17 |
| DW | 16, | 16, | 16, | 15, | 15, | 14, | 14, | 14, | 14, | 13, | 12, | 13, | 12, | 12, | 11, | 12 |
| DW | 11, | 11, | 10, | 11, | 10, | 10, | 10, | 10, | 9, | 9, | 9, | 9, | 9, | 8, | 9, | 8 |
| DW | 8, | 8, | 8, | 8, | 7, | 8, | 7, | 7, | 7, | 7, | 7, | 7, | 7, | 6, | 7, | 6 |
| DW | 6, | 7, | 6, | 6, | 6, | 5, | 6, | 6, | 5, | 6, | 5, | 6, | 5, | 5, | 5, | 5 |
| DW | 5, | 5, | 5, | 5, | 5, | 5, | 4, | 5, | 4, | 5, | 4, | 5, | 4, | 4, | 5, | 4 |
| DW | 4, | 4, | 4, | 4, | 4, | 4, | 4, | 4, | 3, | 4, | 4, | 4, | 3, | 4, | 3, | 4 |
| DW | 3, | 4, | 3, | 4, | 3, | 3, | 4, | 3, | 3, | 3, | 4, | 3, | 3, | 3, | 3, | 3 |
| DW | 3, | 3, | 3, | 3, | 3, | 3, | 2, | 3, | 3, | 3, | 3, | 2, | 3, | 3, | 2, | 3 |
| DW | 3, | 2, | 3, | 2, | 3, | 2, | 3, | 2, | 3, | 2, | 3, | 2, | 2, | 3, | 2, | 2 |
| DW | 3, | 2, | 2, | 2, | 3, | 2, | 2, | 2, | 2, | 2, | 3, | 2, | 2, | 2, | 2, | 2 |
| DW | 2, | 2, | 2, | 2, | 2, | 2, | 2, | 2, | 2, | 2, | 2, | 2, | 2, | 1, | 2, | 2 |
| DW | 2, | 2, | 2, | 1, | 2, | 2, | 2, | 1, | 2, | 2, | 2, | 1, | 2, | 2, | 1, | 2 |
| DW | 2, | 1, | 2, | 2, | 1, | 2, | 1, | 2, | 2, | 1, | 2, | 1, | 2, | 1, | 2, | 1 |
| DW | 2, | 1, | 2, | 1, | 2, | 1, | 2, | 1, | 2, | 1, | 2, | 1, | 2, | 1, | 2 |
| DW | 1, | 1, | 2, | 1, | 1, | 2, | 1, | 1, | 2, | 1, | 1, | 2, | 1, | 1, | 2, | 1 |
| DW | 1, | 1, | 2, | 1, | 1, | 1, | 2, | 1, | 1, | 1, | 1, | 2, | 1, | 1, | 1, | 1 |
| DW | 1, | 2, | 1, | 1, | 1, | 1, | 1, | 2, | 1, | 1, | 1, | 1, | 1, | 1, | 1, | 1 |
| DW | 1, | 2, | 1, | 1, | 1, | 1, | 1, | 1, | 1, | 1, | 1, | 1, | 1, | 1, | 1, | 1 |
| DW | 1, | 1, | 1, | 1, | 1, | 1, | 1, | 1, | 1, | 1, | 1, | 1, | 1, | 1, | 1, | 1 |
| DW | 1, | 1, | 1, | 1, | 0, | 1, | 1, | 1, | 1, | 1, | 1, | 1, | 1, | 1, | 1, | 0 |
| DW | 1, | 1, | 1, | 1, | 1, | 1, | 1, | 0, | 1, | 1, | 1, | 1, | 1, | 0, | 1, | 1 |
| DW | 1, | 1, | 1, | 0, | 1, | 1, | 1, | 1, | 0, | 1, | 1, | 1, | 1, | 0, | 1, | 1 |
| DW | 1, | 1, | 0, | 1, | 1, | 1, | 0, | 1, | 1, | 1, | 0, | 1, | 1, | 1, | 0, | 1 |
| DW | 1, | 1, | 0, | 1, | 1, | 1, | 0, | 1, | 1, | 0, | 1, | 1, | 0, | 1, | 1, | 1 |
| DW | 0, | 1, | 1, | 0, | 1, | 1, | 0, | 1, | 1, | 0, | 1, | 1, | 0, | 1, | 1, | 0 |
| DW | 1, | 1, | 0, | 1, | 1, | 0, | 1, | 1, | 0, | 1, | 1, | 0, | 1, | 0, | 1, | 1 |
| PMEND EQU | $ | | | | | | | | | | | | | | | |

TABLE 3

Pulse Motor Acceleration Table

| | | | | | | | | | | | | | | | | | |
|---|---|---|---|---|---|---|---|---|---|---|---|---|---|---|---|---|---|
| TBO | EQU | 5715 | | | | | | | | | | | | | | | |
| TCNT16 | EQU | 5 | | | | | | | | | | | | | | | |
| PMTBL16 | EQU | $ | | | | | | | | | | | | | | | |
| | DW | 0, | 523, | 399, | 317, | 260 | | | | | | | | | | | |
| PMEND16 | EQU | $ | | | | | | | | | | | | | | | |
| TCNT8 | EQU | 46 | | | | | | | | | | | | | | | |
| PMTBL8 | EQU | $ | | | | | | | | | | | | | | | |
| | DB | 219, | 188, | 163, | 14, | 127, | 115, | 103, | 94, | 87, | 79, | 73, | 68, | 63, | 59, | 55, | 52 |
| | DB | 48, | 47, | 43, | 41, | 40, | 37, | 36, | 33, | 33, | 31, | 30, | 28, | 27, | 27, | 25, | 25 |
| | DB | 23, | 23, | 22, | 21, | 20, | 20, | 19, | 19, | 18, | 18, | 17, | 16, | 16, | 16 | | |
| PMEND8 | EQU | $ | | | | | | | | | | | | | | | |
| TCNT4 | EQU | 207 | | | | | | | | | | | | | | | |
| PMTBL4 | EQU | $ | | | | | | | | | | | | | | | |
| | DB | 255, | 238, | 238, | 220, | 220, | 203, | 203, | 186, | 186, | 170, | 169, | 153, | 153, | 137, | 136, | 136 |
| | DB | 135, | 135, | 119, | 119, | 119, | 103, | 102, | 118, | 102, | 86, | 101, | 101, | 101, | 85, | 85, | 85 |
| | DB | 85, | 84, | 84, | 84, | 84, | 69, | 68, | 68, | 68, | 68, | 67, | 68, | 67, | 67, | 67, | 67 |

TABLE 3-continued

Pulse Motor Acceleration Table

| | | | | | | | | | | | | | | | | |
|---|---|---|---|---|---|---|---|---|---|---|---|---|---|---|---|---|
| DB | 67, | 52, | 51, | 52, | 51, | 51, | 51, | 51, | 51, | 50, | 51, | 51, | 35, | 50, | 51, | 35 |
| DB | 35, | 35, | 35, | 35, | 34, | 50, | 35, | 34, | 35, | 34, | 34, | 35, | 34, | 34, | 34, | 34 |
| DB | 34, | 34, | 34, | 34, | 34, | 18, | 34, | 34, | 18, | 34, | 34, | 18, | 34, | 18, | 33, | 18 |
| DB | 33, | 33, | 34, | 18, | 18, | 18, | 18, | 18, | 18, | 18, | 18, | 18, | 17, | 33, | 33, | 18 |
| DB | 17, | 33, | 18, | 17, | 33, | 18, | 17, | 18, | 17, | 18, | 17, | 17, | 33, | 17, | 17, | 33 |
| DB | 17, | 17, | 33, | 17, | 17, | 17, | 17, | 33, | 17, | 17, | 17, | 17, | 17, | 17, | 17, | 17 |
| DB | 17, | 17, | 17, | 17, | 17, | 17, | 17, | 17, | 16, | 17, | 17, | 17, | 17, | 17, | 1, | 17 |
| DB | 17, | 17, | 1, | 17, | 17, | 1, | 17, | 17, | 1, | 17, | 16, | 17, | 17, | 1, | 17, | 16 |
| DB | 17, | 16, | 17, | 16, | 17, | 16, | 17, | 16, | 17, | 16, | 17, | 1, | 16, | 17, | 16, | 17 |
| DB | 1, | 16, | 17, | 1, | 16, | 17, | 1, | 16, | 17, | 1, | 16, | 17, | 1, | 1, | 16 | |
| PMEND4 | EQU | $ | | | | | | | | | | | | | | |

What is claimed is:

1. An information recording-reproducing head driving circuit for moving an information recording-reproducing head from a current position on a recording medium to a desired position while velocity-controlling the head, including:

a pulse motor for moving the information recording-reproducing head relative to the recording medium;

a timer for counting down a count value set to determine the driving timing of said pulse motor; and control means for calculating the count value on the basis of a predetermined time table and for setting the count value in said timer, and for generating a driving pulse for said pulse motor when said timer has counted down the count value, said control means subtracting a desired value extracted from said time table from the count value set in said timer the last time to thereby accomplish the calculation of a new count value.

2. An information recording-reproducing head driving circuit according to claim 1, further including memory means for storing said time table therein.

3. An information recording-reproducing head driving circuit according to claim 1, wherein the desired value extracted from said time table is the difference between a count value set in said timer this time and the count value set in said timer the last time.

* * * * *

UNITED STATES PATENT AND TRADEMARK OFFICE
CERTIFICATE OF CORRECTION

PATENT NO. : 5,184,339

DATED : February 2, 1993

INVENTOR(S) : KEIJI TSUCHIYA

It is certified that error appears in the above-identified patent and that said Letters Patent is hereby corrected as shown below:

<u>COLUMN 2</u>
    Line 60, "with" should read --which--.

<u>COLUMN 3</u>
    Line 2, "data" should read --a data--.
    Line 7, "reverse." should read --reverse).--.
    Line 11, "$TB_p$ case" should read --$TB_p$ is the pth table data, p is the table pointer (in the case--.
    Line 43, "dividing" should read --dividing CNT by 2, and the seek track--.
    Line 44, close up left margin.

<u>COLUMN 4</u>
    Line 54, "said" should read --the--.

<u>COLUMN 5</u>
    Line 31, "of" (second occurrence) should read --in--.
    Line 35, "bytes" should read --bytes.--
    Line 42, "2-byte" should read --a 2-byte--.
    Line 45, "1-byte" should read --a 1-byte--.
    Line 64, "2-byte" should read --a 2-byte--.

<u>COLUMN 6</u>
    Line 37, "to, 0" should read --to 0--.
    Line 39, "TB0" should read --$TB_0$--.

UNITED STATES PATENT AND TRADEMARK OFFICE
CERTIFICATE OF CORRECTION

PATENT NO. : 5,184,339

DATED : February 2, 1993

INVENTOR(S) : KEIJI TSUCHIYA

It is certified that error appears in the above-identified patent and that said Letters Patent is hereby corrected as shown below:

COLUMN 7

Line 35, "the," should read --the--.
Line 36, "aban-" should read --advanced--.
Line 37, "doned" should be deleted, and "table to" should read --table pointer p is greater than (TCNT 8 + TCNT 16), the process is advanced to--.
Line 40, "advance" should read --advanced--.
Line 42, "abandoned" should read --advanced--.
Line 44, "data indicated by" should be deleted.
Line 45, "determined" should be deleted.

COLUMN 8

Line 36, "made" should read --provided--.
Line 38, "8-bit" should read --an 8-bit-- and after "table" "an" should be deleted.
Table 1, first row, the three far right columns, "2976, 3897, 2824" should read --2976, 2897, 2824--.

UNITED STATES PATENT AND TRADEMARK OFFICE
CERTIFICATE OF CORRECTION

PATENT NO. : 5,184,339

DATED : February 2, 1993

INVENTOR(S) : KEIJI TSUCHIYA

It is certified that error appears in the above-identified patent and that said Letters Patent is hereby corrected as shown below:

<u>COLUMN 9</u>

Table 1, second row, $7^{th}$, $8^{th}$, and $9^{th}$ columns from the left, "1077, 1074, 1070" should read --1077, 1073, 1070--.

Table 1, seventh row, $3^{rd}$ - $9^{th}$ columns from the left, "867, 875, 873, 871, 859, 847, 855," should read --867, 865, 863, 861, 859, 857, 855,--.

Table 3, eighth row, $3^{rd}$ - $5^{th}$ columns from the left, "163, 14, 127" should read --163, 144, 127--.

Signed and Sealed this

Eighteenth Day of January, 1994

Attest:

BRUCE LEHMAN

Attesting Officer     Commissioner of Patents and Trademarks